(12) United States Patent
Misawa et al.

(10) Patent No.: US 10,224,797 B2
(45) Date of Patent: Mar. 5, 2019

(54) LINEAR MOTOR

(71) Applicant: SANYO DENKI CO., LTD., Tokyo (JP)

(72) Inventors: Yasushi Misawa, Tokyo (JP); Hiroyuki Sato, Tokyo (JP); Akihiko Takahashi, Tokyo (JP); Satoshi Sugita, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 271 days.

(21) Appl. No.: 15/236,514

(22) Filed: Aug. 15, 2016

(65) Prior Publication Data

US 2017/0054354 A1 Feb. 23, 2017

(30) Foreign Application Priority Data

Aug. 18, 2015 (JP) .................................. 2015-161345

(51) Int. Cl.
*H02K 33/18* (2006.01)
*H02K 41/03* (2006.01)
*H02K 1/17* (2006.01)
*H02K 1/34* (2006.01)
*H02K 3/12* (2006.01)
(Continued)

(52) U.S. Cl.
CPC ............... *H02K 33/18* (2013.01); *H02K 1/17* (2013.01); *H02K 1/34* (2013.01); *H02K 3/12* (2013.01); *H02K 5/08* (2013.01); *H02K 41/031* (2013.01); *H02K 1/06* (2013.01); *H02K 2213/03* (2013.01); *H02K 2213/12* (2013.01)

(58) Field of Classification Search
CPC ............ H02K 33/18; H02K 1/17; H02K 1/34; H02K 41/31
USPC ...................................................... 310/12.15
See application file for complete search history.

(56) References Cited

U.S. PATENT DOCUMENTS 5,642,013 A * 6/1997 Wavre .................... H02K 1/146
310/156.45
5,910,691 A * 6/1999 Wavre .................... H02K 41/03
310/12.18
6,476,524 B1 11/2002 Miyamoto
(Continued)

FOREIGN PATENT DOCUMENTS

EP 1056187 A1 11/2000
FR 2882868 A1 9/2006
(Continued)

OTHER PUBLICATIONS

Extended European Search Report dated Jan. 2, 2017 issued in corresponding European Patent Application No. 16183443.7.
(Continued)

*Primary Examiner* — Terrance L Kenerly
(74) *Attorney, Agent, or Firm* — Rankin, Hill & Clark LLP (57) ABSTRACT

A linear motor includes a field core, a stator that includes a plurality of permanent magnets disposed on the field core, and an armature core that includes an armature winding wire, the armature core being disposed via a magnetic void with the permanent magnets. Assuming that a length of the armature core in a traveling direction of the linear motor is Lc, a pitch of the permanent magnets is τp, and N is a natural number, the length Lc of the armature core is specified by $(N \times \tau p - 0.2 \times \tau p) \leq Lc \leq (N \times \tau p + 0.2 \times \tau p)$.

14 Claims, 8 Drawing Sheets

(51) Int. Cl.
*H02K 5/08* (2006.01)
*H02K 1/06* (2006.01)

(56) References Cited

U.S. PATENT DOCUMENTS

| | | | |
|---|---|---|---|
| 6,949,846 B2* | 9/2005 | Sugita | H02K 41/031 310/12.15 |
| 2006/0033386 A1* | 2/2006 | Uchida | H02K 41/03 310/12.04 |
| 2010/0225179 A1* | 9/2010 | Wang | H02K 41/031 310/12.26 |
| 2010/0225180 A1* | 9/2010 | Kawai | H02K 41/03 310/12.26 |
| 2013/0187573 A1* | 7/2013 | Inoue | H02K 41/031 318/135 |
| 2015/0222167 A1 | 8/2015 | Aoyama | |

FOREIGN PATENT DOCUMENTS

| | | |
|---|---|---|
| JP | 2001169529 A2 | 6/2001 |
| JP | 2003299342 A2 | 10/2003 |
| JP | 2004297977 A2 | 10/2004 |
| JP | 2004364374 A2 | 12/2004 |
| JP | 2006042485 A2 | 2/2006 |
| JP | 2006054974 A2 | 2/2006 |
| JP | 2007185033 A2 | 7/2007 |
| JP | 2009100503 A2 | 5/2009 |

OTHER PUBLICATIONS

Notice of Reason for Refusal for Japanese Patent Application No. 2015-161345 dated Nov. 24, 2015.

* cited by examiner

CONVEX PORTION i) WITH CONVEX PORTION      ii) WITHOUT CONVEX PORTION

WIDTH Bj OF CONVEX PORTION (×τp)

FIG. 9C

HEIGHT Hj OF CONVEX PORTION (× Hm)

FIG. 10

ND MOTOR

CROSS-REFERENCE TO RELATED APPLICATION

This application claims priority from Japanese Patent Application No. 2015-161345 filed with the Japan Patent Office on Aug. 18, 2015, the entire content of which is hereby incorporated by reference.

BACKGROUND

1. Technical Field

This disclosure relates to a linear motor.

2. Description of the Related Art

A linear motor includes, for example, a stator and an armature core. The stator includes a field core and a plurality of permanent magnets disposed at the field core. The armature core has an armature winding wire. The armature core is disposed so as to dispose a magnetic void with the permanent magnets. The linear motor generates a cogging thrust. This cogging thrust causes vibrations and a noise during driving the linear motor. Furthermore, this cogging thrust causes deteriorations in positioning performance and speed stability. Therefore, the cogging thrust in the linear motor is preferably small as much as possible. For example, JP-A-2003-299342 and JP-A-2004-364374 disclose techniques to reduce such cogging thrust in the linear motor.

With the technique disclosed in JP-A-2003-299342, a shape of auxiliary teeth (end teeth) of an armature core is shaped by cutting off an outer distal end of main teeth. This reduces a cogging thrust. With the technique disclosed in JP-A-2004-364374, a shape of main teeth to which winding wires are installed in an armature core and a shape of auxiliary teeth at both ends of the armature core differ from one another. This reduces a cogging thrust.

SUMMARY

A linear motor includes a field core, a stator that includes a plurality of permanent magnets disposed on the field core, and an armature core that includes an armature winding wire, the armature core being disposed via a magnetic void with the permanent magnets. Assuming that a length of the armature core in a traveling direction of the linear motor is Lc, a pitch of the permanent magnets is τp, and N is a natural number, the length Lc of the armature core is specified by (N×τp−0.2×τp)≤Lc≤(N×τp+0.2×τp).

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The techniques disclosed in JP-A-2003-299342 and JP-A-2004-364374 mainly focus on differentiating the shape of the main teeth from the shape of the auxiliary teeth and therefore do not mention a relationship between the armature core and the stator. This fails to obtain a sufficient effect to reduce the cogging thrust.

One objective of this disclosure is to provide a technique to further effectively reduce a cogging thrust.

A linear motor according to an embodiment of the present disclosure includes a field core, a stator that includes a plurality of permanent magnets disposed on the field core, and an armature core that includes an armature winding wire, the armature core being disposed via a magnetic void with the permanent magnets. Assuming that a length of the armature core in a traveling direction of the linear motor is Lc, a pitch of the permanent magnets is τp, and N is a natural number, the length Lc of the armature core is specified by (N×τp−0.2×τp)≤Lc≤(N×τp+0.2×τp).

Additional features related to this disclosure will be apparent from this description and the attached drawings. Aspects of this disclosure will be accomplished and achieved by aspects of combinations of elements and various elements, a detailed description described later, and a scope of the attached claims.

This description describes merely typical examples. This description does not limit the scope of the claims and application examples of this disclosure by any means.

With the aspects of this disclosure, a cogging thrust in a linear motor can be further effectively reduced.

To improve thrust characteristics of the linear motor, it is effective to increase a gap flux density between an armature core and a field magnet and configure a high density armature winding wire. To increase the gap flux density, regarding the armature core shape, both teeth distal ends, which are generally against a magnet, are formed into a convex shape. This core shape is effective to improve the thrust characteristics. However, to configure a high-density winding wire inside a slot of the armature core with this shape, for example, the armature core is divided by teeth, and wires are individually wound around the divided armature cores (see JP-A-2003-299342). The cores are accurately arranged, secured, and integrated. Accordingly, this method increases the number of components of a motor and degrades a rigidity of the armature core (a viewpoint A).

With the linear motor, a magnetic attractive force acts on between the magnet and the armature core. This magnetic attractive force is four to five times as large as a maximum thrust of the linear motor. Therefore, a high-rigidity structure that holds the magnetic attractive force is employed for an apparatus to which the linear motor is mounted (a viewpoint B).

This embodiment achieves a constitution of the linear motor that reduces the cogging thrust. Furthermore, this embodiment also discloses techniques on the above-described viewpoints A and B.

Accordingly, the linear motor (a structure of the linear motor) according to this embodiment ensures achieving at least one of: a reduction in the cogging thrust in the linear motor, an improvement in the thrust characteristics, a reduction in the magnetic attractive force, an improvement in machine stiffness of the linear motor itself, and an improvement in assemblability.

The following describes the embodiments with reference to the attached drawings. The attached drawings may show functionally identical elements by identical reference numerals. The attached drawings illustrate specific embodiments and mounting examples following a principle of the technique of this disclosure. These drawings are illustrated for understanding of the technique of this disclosure and therefore are not used to limitedly interpret the technique of this disclosure.

This embodiment sufficiently describes the technique of this disclosure in detail to embody the technique by those skilled in the art. Note that, other implementations and configurations are also possible. Modifications of constitutions and structures and various replacements of the elements are possible without departing from the scope and the spirit of a technical idea of this disclosure. Therefore, the following description should not be limitedly interpreted.

Constitution of Linear Motor

Figure 1:
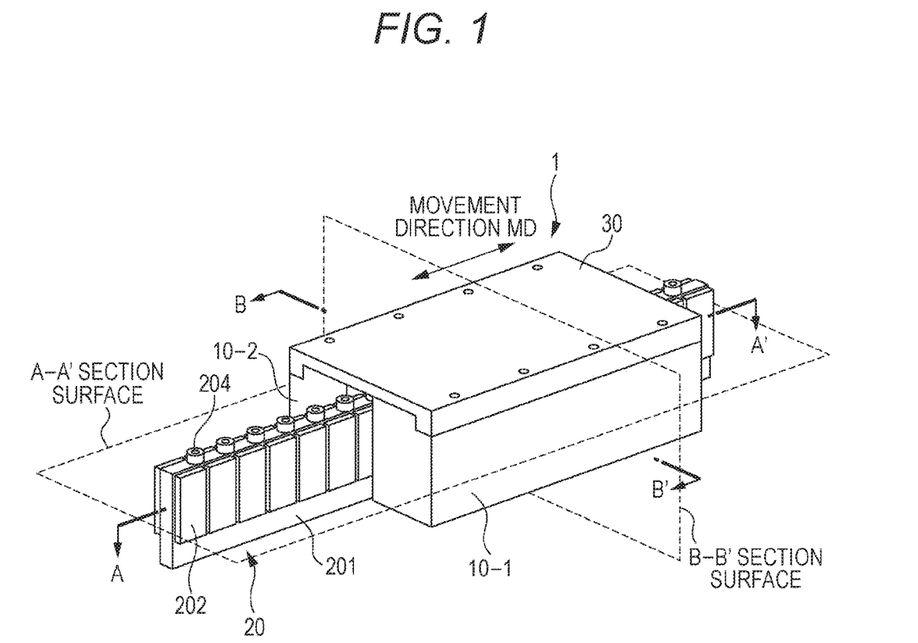
FIG. 1 illustrates an appearance of a linear motor according to an embodiment.

FIG. 1 illustrates a schematic constitution of an external linear motor 1 according to the embodiment. The linear motor 1 includes two armature cores 10_1 and 10_2 (hereinafter may be simply referred to as an armature core 10), a top plate (also referred to as a coupling plate) 30, which couples these armature cores 10_1 and 10_2, and a stator 20. The stator 20 includes a field core 201 and a plurality of magnets (permanent magnets) 202. The plurality of permanent magnets 202 are secured to the field core 201 with, for example, screws.

As illustrated in FIG. 1, the linear motor 1 according to this embodiment employs a structure of sandwiching the stator 20 with the two armature cores 10_1 and 10_2 from up and down. That is, the two armature cores 10_1 and 10_2 and the top plate 30 form a U shape. In the linear motor 1, the stator 20 is secured to a secured surface (for example, a wall or a floor). The armature cores 10_1 and 10_2 move in a movement (travelling) direction MD along the stator 20.

Figure 2:
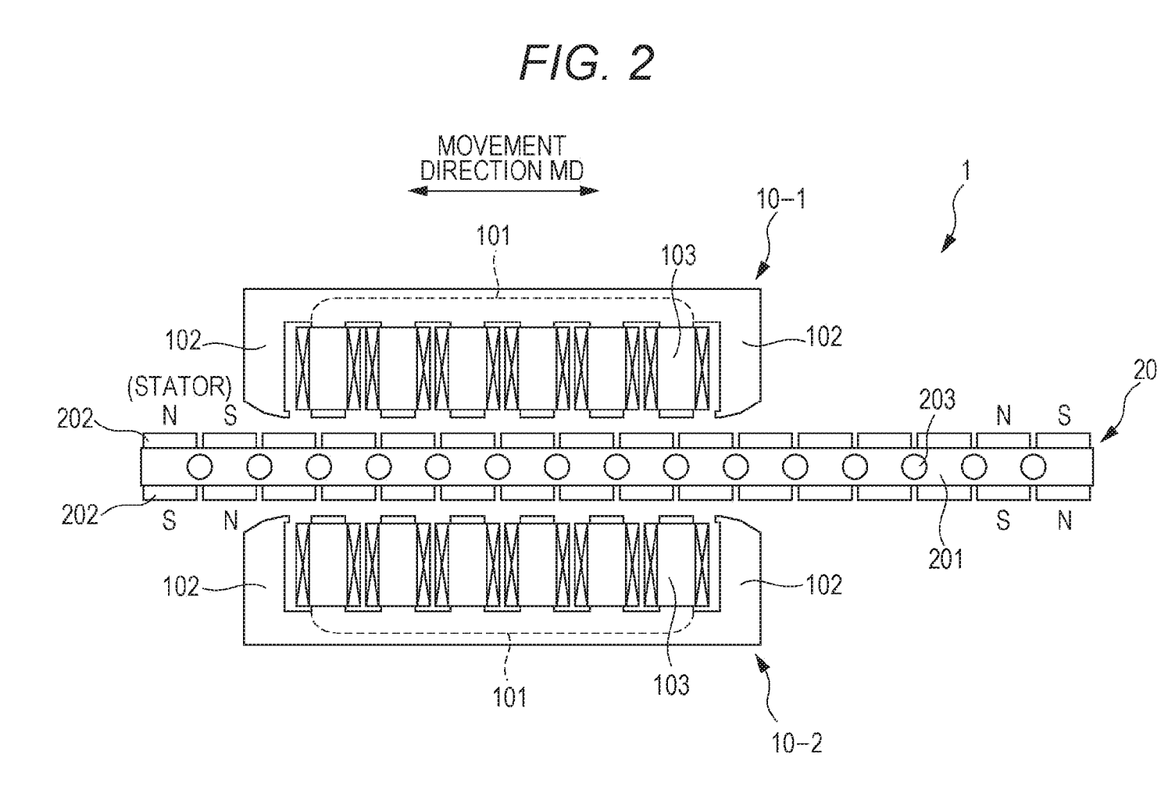
FIG. 2 illustrates a constitution of a cross-sectional linear motor taken along line A-A' in FIG. 1.

FIG. 2 illustrates a constitution of the cross-sectional linear motor 1 taken along line A-A' in FIG. 1 (an A-A' section surface). As illustrated in FIG. 2, the armature cores 10_1 and 10_2 are each installed opposed to an installation surface of the permanent magnets 202 on the stator 20 via a magnetic void.

The armature cores 10_1 and 10_2 each include main teeth 101, end teeth 102, and an armature winding wire (an air-core coil) 103 installed to the main teeth.

The stator 20 includes the field core 201 and the plurality of permanent magnets 202. The plurality of permanent magnets 202 are arranged on both surfaces of the field core 201 along the movement direction MD such that the polarities (N and S) differ in alternation. The stator 20 may be modularized so as to have a length N (N is an integer) times of a pitch τp of the permanent magnets (the field magnets) 202 or have a length twice the pitch τp of the permanent magnets 202 (2×τp). That is, the stator 20 may be a field module with the above-described length (or a combination of such field modules). The field module (the stator module) includes the field core 201 and the permanent magnets 202. For example, the stator 20 illustrated in FIG. 1 may be one field module (the stator module) with a plurality of sets of the permanent magnets 202.

In this case, a plurality of these field modules are arranged along the movement direction MD of the armature cores 10_1 and 10_2. This ensures easily changing the length of the stator 20. The field core 201 includes a plurality of fixation screw through-holes (fixing holes) 203. An insertion of fixation screws (fixing members) 204 into the fixation screw through-holes 203 and tightening the fixation screws 204 to screw holes disposed on the secured surface (for example, the wall or the floor) secures the field module to the secured surface. That is, a plurality of the field modules are prepared and the respective field modules are secured to the secured surface with the fixation screw through-holes 203 and the fixation screws 204 such that the respective field modules are linearly coupled to one another along the movement direction MD. Thus, the one stator 20 is constituted.

An armature core length Lc (see FIG. 6) is shorter than a total length of the stator 20. The use of this structure where all sites (or almost all the sites) of the armature core 10 and the armature winding wires 103 are opposed to the permanent magnets 202 ensures the use of all magnetic flux (or almost all the magnetic flux) generated from the armature winding wires 103 for thrust. This ensures driving the linear motor 1 by minimum necessary armature current, thereby ensuring achieving a reduction in copper loss and energy saving.

Figure 3:
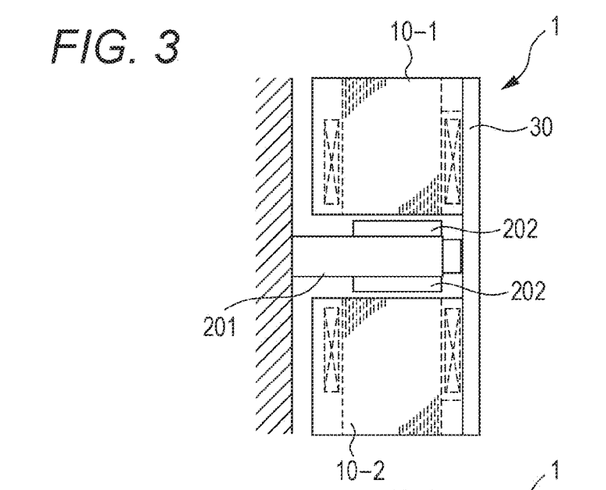
FIG. 3 illustrates a constitution of a cross-sectional linear motor taken along line B-B' in FIG. 1.

FIG. 3 illustrates a constitution of the cross-sectional linear motor 1 taken along line B-B' in FIG. 1 (a B-B' section surface). As apparent from FIG. 3, the two armature cores 10_1 and 10_2, which are disposed on both sides of the stator 20, are coupled with the top plate (the coupling plate) 30. This integrates the armature core 10_1, the armature core 10_2, and the top plate 30. The respective armature cores 10_1 and 10_2 and the top plate 30 are secured to one another with, for example, screws.

Figure 4:
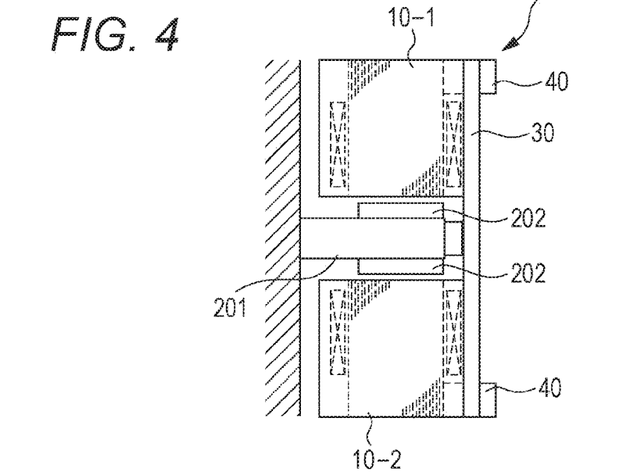
FIG. 4 is illustrates a constitution of a cross-sectional linear motor according to a modification with a heat insulating plate mounted to a top plate taken along line B-B' (see FIG. 1)
Figure 5:
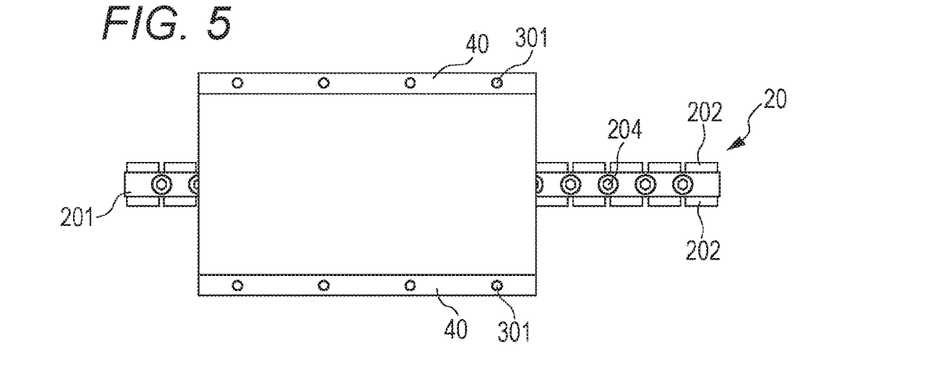
FIG. 5 illustrates the linear motor according to the modification in FIG. 4 from a direction of the top plate.

That is, as illustrated in FIG. 5, the linear motor 1 includes screw holes 301, which penetrates the top plate 30, and through-holes (or screw holes), which penetrate the armature core 10. An insertion and tightening of the screws from the secured surface side (the left side in FIG. 4) to the screw holes 301 on the top plate 30 via the through-holes on the armature core 10 integrates the armature core 10_1, the armature core 10_2, and the top plate 30. These screws (first screws) do not penetrate the screw holes 301 on the top plate 30. Distal ends of the first screws are located inside the screw holes 301.

FIG. 4 illustrates a constitution of the cross-sectional linear motor 1 according to a modification taken along line B-B' (see FIG. 1) (the B-B' section surface). With the linear motor 1 illustrated in FIG. 4, heat insulating plates 40 are mounted to the top plate 30. FIG. 5 illustrates this linear motor 1 from the top plate 30 direction.

As described above, in the linear motor 1 according to this embodiment, the first screws, which secure the top plate 30 and the armature cores 10_1 and 10_2 to one another, are tightened from the secured surface side to the screw holes 301 on the top plate 30. The linear motor 1 according to the modification further includes the heat insulating plates (heat insulating members) 40 at sites where the screw holes 301 are disposed on the top plate 30 (as one example, ends of the top plate 30).

This heat insulating plate 40 is made of a material with a coefficient of heat transfer lower than that of the top plate 30, which is a plate-shaped material. In the case where a driving-target apparatus is mounted to the top plate 30, heat is transmitted from a contact surface in contact with the top plate 30 to the driving-target apparatus, and this heat possibility adversely affects this apparatus. The first screws, which are inserted into the screw holes 301 from the secured surface side, are usually made of metal (The first screws may be made of resin. Note that, in terms of strength, the first screws are preferably made of metal). Accordingly, the heat is transmitted from the armature cores 10_1 and 10_2 to the apparatus to be driven (not illustrated) via the first screws and the top plate 30. This heat possibly adversely affects the apparatus. Accordingly, in the modification, the heat insulating plates 40 are disposed to cover the contact surface of the top plate 30 in contact with the driving-target apparatus. The heat insulating plates may be disposed to cover the entire top plate 30. This ensures cutting off the heat transmitted from the top plate 30 to the driving-target apparatus regarding the entire top plate 30.

The heat insulating plates 40 include the through-holes at parts corresponding to the screw holes 301 on the top plate 30 (that is, the screw holes 301 are exposed). From the heat insulating plate 40 side (the right side in FIG. 4), for example, screws (second screws) are inserted into and tightened to these screw holes 301 via the through-holes, which are disposed on the target apparatus driven by the linear motor 1. This secures the top plate 30 to the target apparatus. That is, the screw holes 301 have a function as a fixing portion to secure the linear motor 1 to the target apparatus driven by the linear motor 1.

Relationship between Armature Core and Stator and Features of Armature Core

Figure 6:
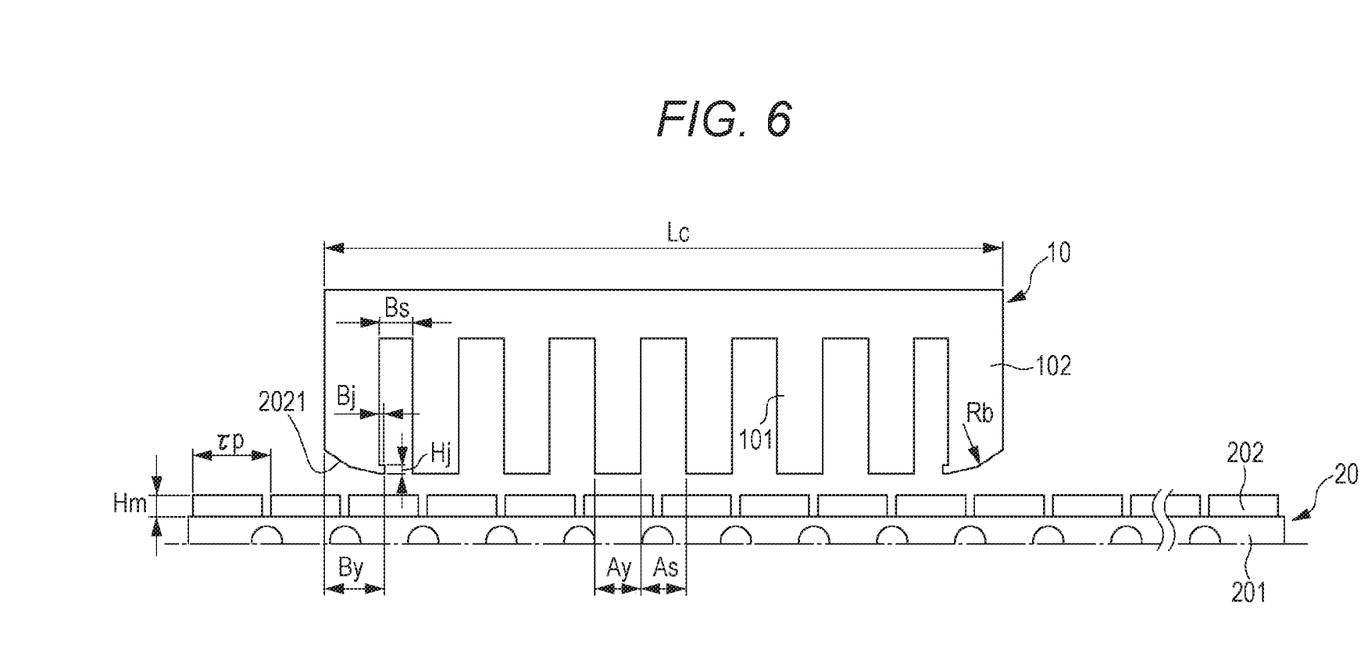
FIG. 6 describes a relationship between an armature core and a stator and a feature of the armature core of the linear motor according to the embodiment.

FIG. 6 describes the relationship between the armature core 10 and the stator 20 of the linear motor 1 according to this embodiment and the features of the armature core 10.

(i) Relationship Between Armature Core Length and Stator Length

A main cause of a cogging thrust in the linear motor 1 is an "end effect" brought by an action of the magnetic flux by the permanent magnets 202 at the ends of the armature core 10. That is, when a force that teeth on the right-side end teeth (the right end teeth) of the armature core 10 are suctioned by the permanent magnets 202, which are installed on the stator 20, (a suctioning force) relatively differs from a force that the left-side end teeth (the left end teeth) of the armature core 10 are away from the permanent magnets 202 (a repulsion force), the cogging thrust is generated. Relatively equalizing the suctioning force and the repulsion force theoretically sets the cogging thrust "0." To reduce the end effect by relatively equalizing the suctioning force and the repulsion force, it is effective to design the overall length Lc of the armature core 10 to be a length close to integral multiples of the pitch τp of the permanent magnets 202. The end effect is caused by the suctioning force and the repulsion force by the magnetic flux from the permanent magnets 202 (the field magnets) acting on the armature core 10. Accordingly, designing Lc to be the length close to the integral multiples of τp (namely, an optimization of Lc) ensures substantially equalizing the magnetic attractive force acting on the one end of the armature core 10 and the magnetic repulsion force acting on the other end.

It is preferable that a slot width As of the main teeth 101 of the armature core 10 is equal to or more than a slot width Bs of the end teeth 102 of the armature core 10. This ensures increasing R (Rb) of a taper-shaped portion (a curved-surface-shaped portion) 2021 at the end teeth 102. Furthermore, a width By of the end teeth 102 can be provided large.

Figure 7A:
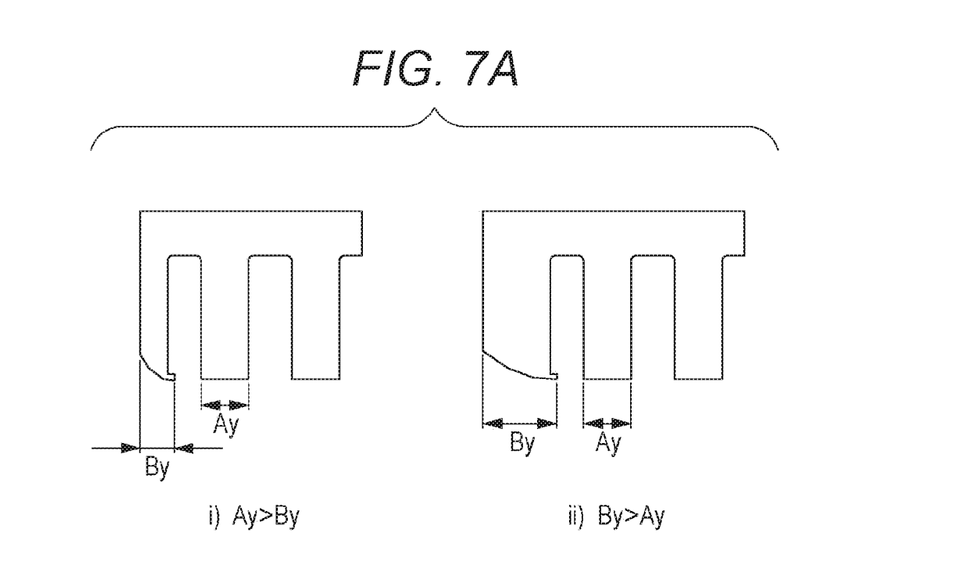
FIGS. 7A and 7B describe a relationship between an end teeth width and a main teeth width of the armature core of the linear motor according to the embodiment.
Figure 7B:
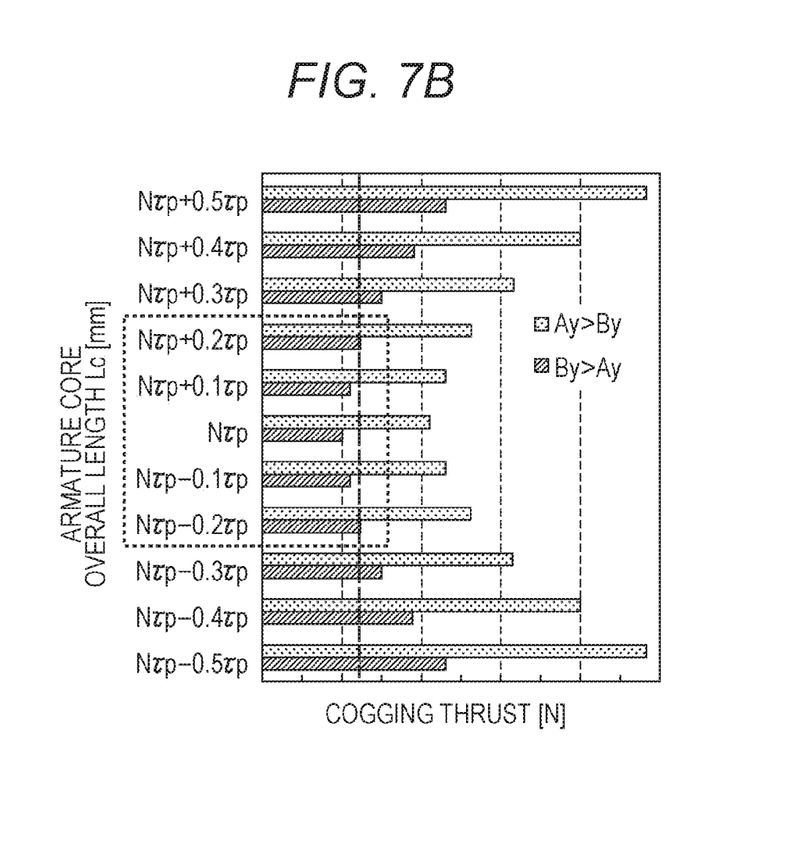

As illustrated in FIG. 7B, with the armature core length Lc equal to N×τp, the cogging thrust can be small.

(ii) Relationship Between End Teeth Width and Main Teeth Width

FIGS. 7A and B describe the relationship between the end teeth width of and the main teeth width of the armature core 10 of the linear motor 1 according to this embodiment. Here, as illustrated in FIGS. 7A and 7B, a cogging thrust where a main teeth width Ay is larger than an end teeth width By is compared with a cogging thrust where the end teeth width By is larger than the main teeth width Ay.

An experiment that measures the cogging thrusts in the case where the main teeth width Ay is larger than the end teeth width By and in the case where the end teeth width By is larger than the main teeth width Ay (see FIG. 7A) was conducted. Consequently, as illustrated in FIG. 7B, in all cases where the armature core length Lc is within a length from N×τp−0.5×τp to N×τp+0.5×τp, when the end teeth width By is larger than the main teeth width Ay, the cogging thrust is small.

An Lc range practically effective to the reduction in cogging thrust is: N×τp−0.2×τp to N×τp+0.2×τp.

Accordingly, conditions of the length of Lc and the teeth width effective to reduce the cogging thrust is as follows.

$$N\times\tau p - 0.2\times\tau p \leq Lc \leq N\times\tau p + 0.2\times\tau p \text{ and } By > Ay$$

(iii) Shape of End Teeth

The permanent magnets 202 have a variation in magnetic flux density depending on a difference in the magnetic flux density of the individual permanent magnets 202. Accordingly, only simply designing Lc to be the length close to the integral multiples of τp is sometimes difficult to effectively restrain all (or almost all) the cogging thrust. Therefore, the distal ends of the end teeth 102, which are disposed at both ends of the armature core 10, are lengthened and formed into a tapered shape. Furthermore, a convex portion is disposed inside the end teeth 102. This eases restraining the end effect. It is more effective that this tapered shape is an arc shape rather than a rectilinear.

Figure 8A:
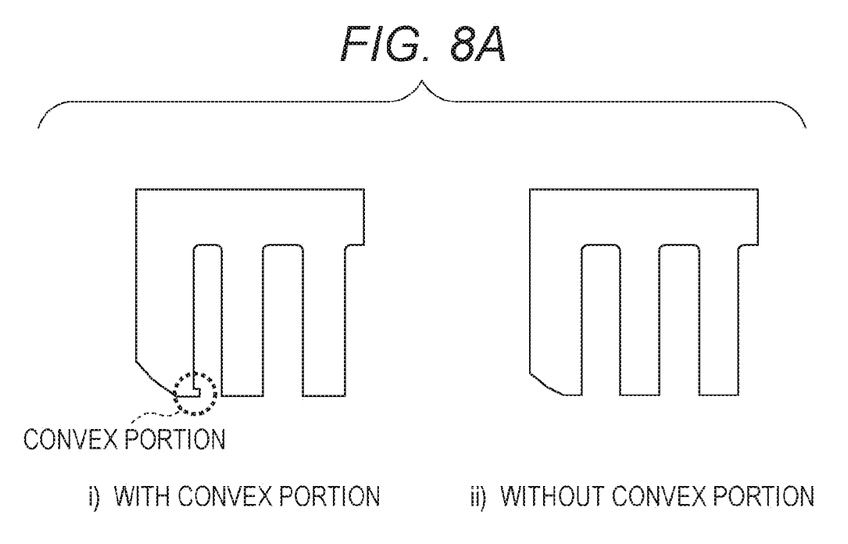
FIGS. 8A and 8B illustrate a comparison result of magnitudes of cogging thrusts depending on presence/absence of a convex portion at the end teeth.
Figure 8B:
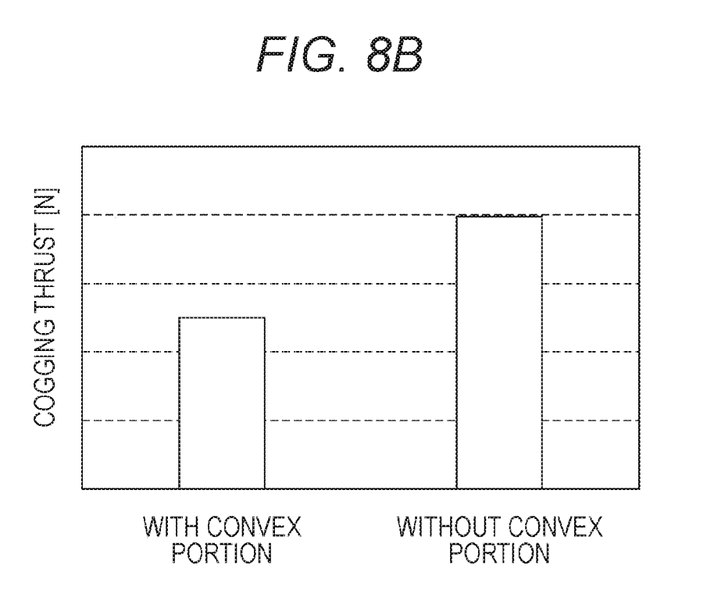

FIGS. 8A and 8B illustrate a comparison result of magnitudes of the cogging thrusts in the end teeth 102 depending on the presence/absence of the convex portion at the end teeth 102. FIG. 8A illustrates an exemplary constitution where the convex portion is disposed inside (the side where the main teeth 101 is present) the end teeth 102 and an exemplary constitution where the convex portion is not disposed inside the end teeth 102. FIG. 8B illustrates how much the cogging thrusts differ between the case where the convex portion is disposed inside the end teeth 102 and the case where the convex portion is not disposed inside the end teeth 102. As apparent from FIG. 8B, disposing the convex-shaped portion (the convex portion) inside the end teeth 102 of the armature core 10 ensures reducing the cogging thrust by around 40%.

(iv) Size of Convex Portion at End Teeth

Figure 9A:
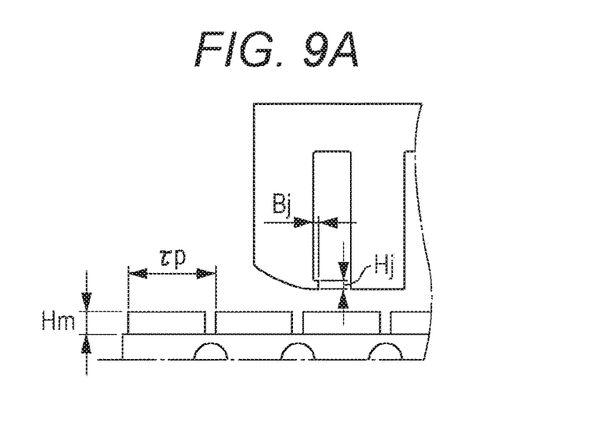
FIG. 9A illustrates a proximity of the convex portion disposed at the end teeth of the armature core.
Figure 9B:
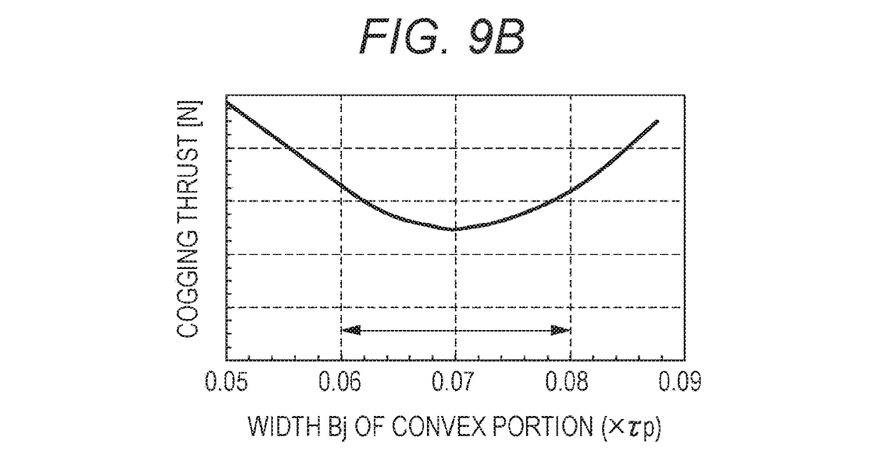
FIGS. 9B and 9C are drawings (experimental results) to examine an effective size of the convex portion, which is disposed at the end teeth of the armature core, to reduce the cogging thrust.
Figure 9C:
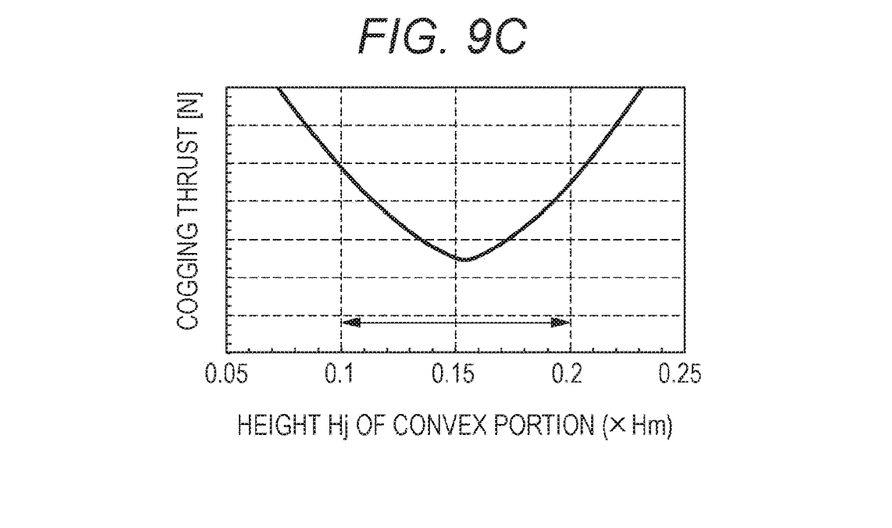

FIG. 9A illustrates a proximity of the convex portion, which is disposed at the end teeth 102 of the armature core 10. FIGS. 9B and 9C are drawings (experimental results) to examine an effective size of the convex portion, which is disposed at the end teeth 102 of the armature core 10, to reduce the cogging thrust. FIG. 9B illustrates an effective width Bj of the convex portion. FIG. 9C illustrates an effective height Hj of the convex portion.

As apparent from FIGS. 9B and 9C, it is not true that the larger the convex portion is, the better the effect is. For example, it has been found that the cogging thrust becomes the minimum with the width Bj of the convex portion at 0.07×τp. Furthermore, it has been found that, with the width Bj of the convex portion within a range of 0.06×τp to 0.08×τp, the sufficient cogging thrust reduction effect can be obtained. Assuming that a thickness of the permanent magnet 202 is Hm, with the height Hj of the convex portion at 0.15×Hm, the cogging thrust becomes the minimum. It has been found that, with the height Hj of the convex portion within a range of 0.1×Hm to 0.2×Hm, the sufficient cogging thrust reduction effect can be obtained.

Constitution with which Thrust Characteristics Improvement, Machine Stiffness Improvement, Assemblability Improvement, and Magnetic Attractive Force Reduction are Achieved To achieve the improvement in thrust characteristics of the linear motor 1 and a simplification of a structure to which the linear motor 1 is mounted, as described above, this embodiment employs a structure that disposes the permanent magnets (the field magnets) 202 at the center of the linear motor 1 and disposes the two armature cores outside the permanent magnets 202.

To improve the thrust characteristics of the linear motor 1, increasing the gap flux density between the permanent magnets (the field magnets) 202 and the armature cores 10_1 and 10_2 is effective. In view of this, with the structure of the linear motor 1 according to this embodiment, the permanent magnets 202 are arranged on both sides of the field core 201 such that the polarities differ in alternation. Furthermore, the polarities of the permanent magnets 202 face a direction of penetrating the stator 20. This ensures reducing a leakage of the magnetic flux and maximally utilizing the magnet magnetic flux to generate the thrust.

Figure 10:
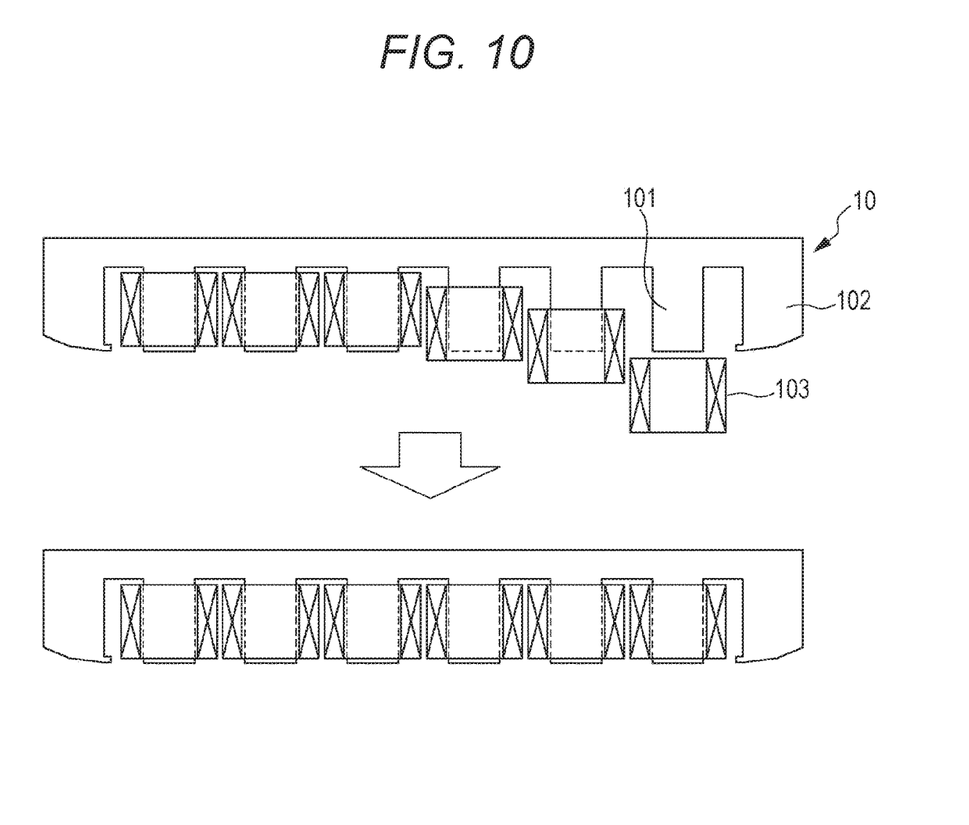
FIG. 10 describes an advantage of a distal end of the main teeth being a straight line (straight teeth).

Furthermore, to improve the thrust characteristics, it is effective to dispose the armature winding wires 103 at slots of the armature cores 10_1 and 10_2 at a high density. To achieve this, generally, with the conventional armature core, main teeth are divided, and wires are wound around the divided main teeth. Furthermore, after winding the wire, the divided main teeth are integrated. With the conventional armature core, wires are generally wound around the divided cores with teeth having a convex portion at a distal end (teeth with jaw). Meanwhile, as illustrated in FIG. 10, this embodiment configures the distal ends of the main teeth 101 (the side surfaces at the distal end) into a straight line (straight teeth). This ensures inserting the armature winding wire 103 from the distal ends of the main teeth 101. This eliminates a need for dividing the individual armature core 10_1 and the armature core 10_2. This ensures integrally constituting the armature core 10_1 and the armature core 10_2, respectively. This ensures disposing the high-density winding wire around the armature core 10 while the deterioration in machine stiffness, the deterioration in assembly accuracy, an increase in the number of components of the armature cores 10_1 and 10_2, and the like are restrained.

Furthermore, with the linear motor 1, the magnetic attractive force acts between the permanent magnets (the field magnets) 202 and the armature cores 10_1 and 10_2. This embodiment couples and integrates the two armature cores 10_1 and 10_2 with the top plate (the coupling plate) 30, which is the plate-shaped component. Thus, the magnetic attractive force is less likely to act on the structure to which the linear motor 1 is mounted. This ensures simplifying the structure to which the linear motor 1 is mounted.

SUMMARY

With the linear motor according to this embodiment, assuming that the length of the armature core in the traveling direction of the linear motor (the movement direction MD) is Lc, the pitch of the permanent magnets is τp, and N is a natural number, the length Lc of the armature core is specified by (N×τp−0.2×τp)≤Lc≤(N×τp+0.2×τp). Accordingly, the linear motor according to this embodiment can effectively reduce the cogging thrust compared with that of the conventional linear motor.

Here, the width By of the end teeth in the traveling direction of the linear motor is preferably larger than the width Ay of one main teeth in the traveling direction of the linear motor. This ensures further reducing the cogging thrust. It is preferable that the distal ends of the end teeth have a shape with curved surface. Forming the curved surface at the distal ends of the end teeth ensures reducing the cogging thrust compared with the case where a rectilinear shape is employed for the distal ends of the end teeth.

The end teeth may include the convex portion projecting to the inside of the armature core. In this case, assuming that the projection width of the convex portion in the traveling direction is Bj, the projection height of the convex portion perpendicular to the traveling direction is Hj, and the height of the permanent magnet is Hm, it is preferable that the convex portion has a size specified by 0.06×τp≤Bj≤0.08×τp and 0.1×Hm≤Hj≤0.2×Hm. That is, it is preferable that the projection width Bj, the projection height Hj, and the height Hm of the permanent magnet are configured so as to meet the above-described expressions. This ensures further reducing the cogging thrust more effectively.

The armature core is preferably configured to meet the slot width As of the main teeth equal to or more than the slot width Bs of the end teeth. This ensures increasing R of the curved-surface-shaped portion of the end teeth and further increasing the end teeth width By. These features allow contributing to the reduction in cogging thrust.

Furthermore, in the stator, a plurality of the permanent magnets are arranged on both surfaces of the field core such that the polarities differ in alternation along the traveling direction of the linear motor and such that the polarities are present in the direction of penetrating the stator at both surfaces of the field core. The two armature cores are arranged opposed to both surfaces of the field core. In this case, the two armature cores may be coupled and integrated with the plate-shaped material (the top plate). These two armature cores and the plate-shaped material may be constituted to have a U shape.

The plate-shaped material may include a fixing portion (for example, a screw hole) to secure the target apparatus driven by the linear motor to the linear motor. To the fixing portion of the plate-shaped material (for example, the screw hole part or a peripheral part of the screw hole), a heat insulating member constituted of a material with a coefficient of heat transfer lower than that of the plate-shaped material may be mounted. This ensures restraining a transmission of the heat generated in the linear motor to the driving-target apparatus. The heat insulating member may be mounted across the entire plate-shaped material (top plate).

The stator may be constituted by coupling a plurality of stator modules. Specifically, fixing holes (through-holes or screw holes) are disposed at the respective stator modules. An insertion of fixing members (for example, screws) into these fixing holes and fastening the fixing members constitutes a stator with desired length.

The linear motor according to this embodiment includes a plurality of the main teeth having the linear shape (or the cylindrical shape) without a jaw, which has been provided with the conventional main teeth. That is, a plurality of the main teeth may have a constant (or approximately constant) width (a teeth width) from the base end to the distal end. This ensures inserting the armature winding wire from the distal end of the main teeth. This eliminates a need for dividing the armature core. Accordingly, the armature core can be integrally formed. Consequently, a rigidity of the armature core can be enhanced.

The following explanation does not intend strict interpretation of expressions such as "all," "perpendicular to," "identical," "equal to," "differ from," "straight line," and "constant." That is, these expressions allow design and manufacturing tolerance and error and therefore mean "substantially all," "substantially perpendicular to," "substantially identical," "substantially equal to," "substantially differ from," "substantially straight line," and "substantially constant," respectively.

The main cause of the cogging thrust in the linear motor 1 is "the end effect," which is an effect where the magnetic flux by the field magnets 202 acts on the ends of the armature core 10. That is, when the force that the core at the right-side end (the right end teeth) is suctioned to the permanent magnets 202, which are installed at the stator 20, relatively differs from the force that the core at the left-side (the left end teeth) is away from the permanent magnets 202, the cogging thrust is generated. Relatively equalizing this suction force and the separation force theoretically sets the cogging thrust "0." To relatively equalize this suction force and the separation force to reduce the end effect, it is effective to design the overall length Lc of the armature core 10 to be a length close to the integral multiples of the pitch τp of the field magnets 202. Since the end effect is caused by the suctioning force of the armature core and the field magnet magnetic flux, the optimization of Lc to the length close to the integral multiples of τp ensures balancing and canceling the magnetic attractive force acting on both ends of the core.

The permanent magnet 202 may be secured to the field core 201 with the fixation screw 204.

In this embodiment, as the structure of the linear motor 1, the polarities of the permanent magnets 202, which are disposed on both sides of the field core 201, are arranged in alternation in the direction of penetrating the stator 20. This reduces a leakage of the magnet magnetic flux, thereby allowing maximally utilizing the magnet magnetic flux to generate a thrust.

The linear motor according to this embodiment may be the following first to tenth linear motors.

A first linear motor includes a stator and an armature core. The stator is constituted by disposing a plurality of permanent magnets on a field core. The armature core includes an armature winding wire. The armature core is disposed via a magnetic void with the permanent magnets. Assuming that a length of the armature core in a traveling direction of the linear motor is Lc, a pitch of the permanent magnets is τp, and N is a natural number, the length Lc of the armature core is specified by $(N \times \tau p - 0.2 \times \tau p) \leq Lc \leq (N \times \tau p + 0.2 \times \tau p)$.

A second linear motor according to the first linear motor is configured as follows. The armature core includes a plurality of main teeth to which a winding wire is installed and end teeth. The width By of the end teeth in the traveling direction of the linear motor is larger than a width Ay of the one main teeth in the traveling direction of the linear motor.

A third linear motor according to the first or the second linear motor is configured as follows. The armature core includes a plurality of main teeth to which a winding wire is installed and end teeth. A distal end of the end teeth forms a shape with a curved surface.

A fourth linear motor according to any one of the first to the third linear motors is configured as follows. The armature core includes a plurality of main teeth to which a winding wire is installed and end teeth. The end teeth include a convex portion projecting inside the armature core. Assuming that a projection width in the traveling direction is Bj, a projection height in a direction perpendicular to the traveling direction is Hj, and a height of the permanent magnets is Hm, this convex portion is specified by $0.06 \times \tau p \leq Bj \leq 0.08 \times \tau p$ and $0.1 \times Hm \leq Hj \leq 0.2 \times Hm$.

A fifth linear motor according to the fourth linear motor is configured as follows. The armature core includes a plurality of main teeth to which a winding wire is installed and end teeth. The main teeth have a slot width As equal to or more than the slot width Bs of the end teeth.

A sixth linear motor according to any one of the first to the fifth linear motors is configured as follows. In the stator, the plurality of permanent magnets are arranged on both surfaces of the field core such that polarities differ in alternation with respect to the traveling direction on both surfaces of the field core and such that the polarities are present in a direction of penetrating the stator at both surfaces of the field core. The two armature cores are arranged to be opposed to both surfaces of the field core.

A seventh linear motor according to the sixth linear motor is configured as follows. The two armature cores are coupled and integrated with a plate-shaped material. The two armature cores and the plate-shaped material form a U shape.

An eighth linear motor according to the seventh linear motor is configured as follows. The plate-shaped material includes a fixing portion. The fixing portion secures the linear motor to a target apparatus driven by the linear motor. To at least the fixing portion on the plate-shaped material, a heat insulating member is mounted. The heat insulating member is made of a material with a coefficient of heat transfer lower than a coefficient of heat transfer of the plate-shaped material.

A ninth linear motor according to any one of the first to the eighth linear motors is configured as follows. The stator is constituted by disposing the permanent magnets on both surfaces. A plurality of stator modules including fixing holes is prepared. These plurality of stator modules are coupled and constituted by an insertion of fixing members into the fixing holes.

A tenth linear motor according to any one of the first to the ninth linear motors is configured as follows. The armature core includes a plurality of main teeth to which a winding wire is installed and end teeth. The plurality of main teeth has a linear shape without a jaw to ensure an insertion of the armature winding wire from a distal end of these main teeth.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A linear motor comprising:
a field core;
a stator that includes a plurality of permanent magnets disposed on the field core; and
an armature core that includes an armature winding wire, the armature core being disposed via a magnetic void with the permanent magnets, wherein
where a length of the armature core in a traveling direction of the linear motor is Lc, a pitch of the permanent magnets is τp, and N is a natural number, the length Lc of the armature core is specified by $(N \times τp - 0.2 \times τp) \leq Lc \leq (N \times τp + 0.2 \times τp)$,
the armature core includes a plurality of main teeth to which a winding wire is installed, and end teeth,
each of the end teeth includes a convex portion projecting to an inside of the armature core, and
where a projection width of the convex portion in the traveling direction is Bj, a projection height of the convex portion perpendicular to the traveling direction is Hj, and a height of the permanent magnets is Hm, $0.06 \times τp \leq Bj \leq 0.08 \times τp$ and $0.1 \times Hm \leq Hj \leq 0.2 \times Hm$ are met.

2. The linear motor according to claim 1, wherein:
a width (By) of the end teeth in the traveling direction of the linear motor is larger than a width (Ay) of the one main teeth in the traveling direction of the linear motor.

3. The linear motor according to claim 2, wherein:
a distal end of the end teeth has a shape with a curved surface.

4. The linear motor according to claim 3, wherein the main teeth have a slot width (As) equal to or more than a slot width (Bs) of the end teeth.

5. The linear motor according to claim 2, wherein the main teeth have a slot width (As) equal to or more than a slot width (Bs) of the end teeth.

6. The linear motor according to claim 1, wherein:
a distal end of the end teeth has a shape with a curved surface.

7. The linear motor according to claim 6, wherein the main teeth have a slot width (As) equal to or more than a slot width (Bs) of the end teeth.

8. The linear motor according to claim 1, wherein the main teeth have a slot width (As) equal to or more than a slot width (Bs) of the end teeth.

9. The linear motor according to claim 1, wherein:
in the stator, the plurality of permanent magnets are arranged on both surfaces of the field core such that polarities differ in alternation along the traveling direction and such that the polarities are present in a direction of penetrating the stator at both surfaces of the field core, and
the two armature cores are arranged to be opposed to both surfaces of the field core.

10. The linear motor according to claim 9, further comprising
a plate-shaped material that couples and integrates the two armature cores, wherein
the two armature cores and the plate-shaped material form a U shape.

11. The linear motor according to claim 10, wherein:
the plate-shaped material includes a fixing portion, the fixing portion securing the linear motor to a target apparatus driven by the linear motor, and
a heat insulating member is mounted to at least the fixing portion on the plate-shaped material, the heat insulating member being made of a material with a coefficient of heat transfer lower than a coefficient of heat transfer of the plate-shaped material.

12. The linear motor according to claim 1, wherein:
the stator includes a plurality of stator modules constituted by disposing a plurality of the permanent magnets on both surfaces, the stator modules including fixing holes, and
the plurality of stator modules are secured and coupled to one another by an insertion of fixing members into the fixing holes.

13. The linear motor according to claim 1, wherein:
the plurality of main teeth has a linear shape without a jaw.

14. The linear motor according to claim 1, wherein:
the convex portion of the end teeth projects toward a center of the length of the armature core.

* * * * *